US012791730B2

(12) United States Patent
Patath

(10) Patent No.: US 12,791,730 B2
(45) Date of Patent: Nov. 10, 2026

(54) SYSTEMS AND METHODS FOR ESTIMATING A GAP BETWEEN POSITIONING AND ODOMETRY SIGNALS

(71) Applicant: Toyota Jidosha Kabushiki Kaisha, Toyota (JP)

(72) Inventor: Kartik Patath, Sunnyvale, CA (US)

(73) Assignee: Toyota Jidosha Kabushiki Kaisha, Toyota Aichi-ken (JP)

( * ) Notice: Subject to any disclaimer, the term of this patent is extended or adjusted under 35 U.S.C. 154(b) by 191 days.

(21) Appl. No.: 18/428,329

(22) Filed: Jan. 31, 2024

(65) Prior Publication Data

US 2025/0244487 A1 Jul. 31, 2025

(51) Int. Cl.

| | |
|---|---|
| ***G01S 19/14*** | (2010.01) |
| ***G01S 19/39*** | (2010.01) |
| ***G01S 19/47*** | (2010.01) |
| ***G01S 19/48*** | (2010.01) |

(52) U.S. Cl.

CPC ............ *G01S 19/14* (2013.01); *G01S 19/393* (2019.08); *G01S 19/47* (2013.01); *G01S 19/485* (2020.05)

(58) Field of Classification Search

CPC ........ G01S 19/14; G01S 19/393; G01S 19/47; G01S 19/485

See application file for complete search history.

(56) References Cited

U.S. PATENT DOCUMENTS

| | | | |
|---|---|---|---|
| 2018/0182116 A1 | 6/2018 | Rhoads | |
| 2018/0316844 A1 | 11/2018 | Hatcher, Jr. | |
| 2019/0258251 A1* | 8/2019 | Ditty .................. | G06F 15/7807 |
| 2021/0074020 A1 | 3/2021 | Oki et al. | |
| 2021/0171079 A1* | 6/2021 | Green ..................... | B61L 5/125 |
| 2022/0261567 A1 | 8/2022 | Rodriguez et al. | |
| 2022/0343531 A1 | 10/2022 | Huffman et al. | |
| 2023/0007962 A1 | 1/2023 | Robert | |
| 2023/0242127 A1 | 8/2023 | Bacchus et al. | |
| 2023/0288209 A1* | 9/2023 | Zhang .................. | H04W 64/00 |

(Continued)

OTHER PUBLICATIONS

Hossein Mousazadeh, A technical review on navigation systems of agricultural autonomous off-road vehicles Journal of Terramechanics, vol. 50, Issue 3, Jun. 2013, pp. 211-232. (Year: 2013).*

(Continued)

*Primary Examiner* — Joan T Goodbody

(74) *Attorney, Agent, or Firm* — Christopher G. Darrow; Darrow Mustafa PC

(57) ABSTRACT

Systems, methods, and other embodiments described herein relate to estimating a gap between positioning and odometry speed-signals through time warping for aligning the speed-signals. In one embodiment, a method includes computing a positioning speed-signal and an odometry speed-signal temporally by a vehicle from positioning data and odometry data, the positioning data and the odometry data generated at different frequencies. The method also includes calculating a cost matrix for the positioning speed-signal and the odometry speed-signal using dynamic time warping (DTW). The method also includes extracting a time gap using the cost matrix and aligning the positioning speed-signal and the odometry speed-signal by correcting a lag with the time gap.

20 Claims, 7 Drawing Sheets

(56) References Cited

U.S. PATENT DOCUMENTS

2024/0322555 A1* 9/2024 Sun ........................ H02H 7/268

OTHER PUBLICATIONS

Xiaotong Shen, Hans Andersen, Wei Kang Leong, Hai Xun Kong, Marcelo H. Ang Jr., Daniela Rus, A General Framework for Multi-vehicle Cooperative Localization Using Pose Graph, arXiv:1704.01252, [Submitted on Apr. 5, 2017]. (Year: 2017).*

Michael Hoy, Methods for Collision-Free Navigation of Multiple Mobile Robots in Unknown Cluttered Environments, arXiv:1401.6775, [Submitted on Jan. 27, 2014]. (Year: 2014).*

*F. Sarholz, J. Mehnert, J. Klappstein, J. Dickmann and B. Radig, "Evaluation of different approaches for road course estimation using imaging radar," 2011 IEEE/RSJ International Conference on Intelligent Robots and Systems, San Francisco, CA, USA, 2011, pp. 4587-4592. (Year: 2011).*

Vadlamani et al., "A Novel Indoor Positioning System for unprepared firefighting scenarios," arXiv:2008.01344, Aug. 4, 2020, pp. 1-15.

Lu et al., "Vision-based localization methods under GPS-denied conditions," arXiv:2211.11988, Nov. 22, 2022, pp. 1-32.

Sunit Shantanu Digamber Fulari, "Optical flow GNSS for navigation in the Indian subcontinent (NavIC)" arXiv:2204.05980, Dec. 16, 2023, pp. 1-14.

Li et al., "Sequential Adversarial Learning for Self-Supervised Deep Visual Odometry," Proceedings of the IEEE/CVF International Conference on Computer Vision (ICCV), 2019, pp. 2851-2860.

Unknown, "Dynamic time warping," last accessed on Dec. 22, 2023, 12 pages, found at https://en.wikipedia.org/wiki/Dynamic_time_warping.

Meinard Müller, "Dynamic Time Warping (DTW)," Springer Verlag, ISBN: 3540740473, 2007, 12 pages, found at https://www.audiolabs-erlangen.de/resources/MIR/FMP/C3/C3S2_DTWbasic.html.

* cited by examiner

SYSTEMS AND METHODS FOR ESTIMATING A GAP BETWEEN POSITIONING AND ODOMETRY SIGNALS

TECHNICAL FIELD

The subject matter described herein relates, in general, to estimating gaps and applying adjustments involving vehicle signaling, and, more particularly, to estimating a gap between positioning and odometry speed-signals through time warping for aligning the speed-signals.

BACKGROUND

Vehicles can be equipped with sensors generating signals that facilitate perceiving other vehicles, obstacles, pedestrians, and additional aspects of a surrounding environment. For example, a vehicle uses signals having data from a light detection and ranging (LIDAR) sensor to scan the surrounding environment for landmarks (e.g., traffic lights, stop signs, etc.). Meanwhile, logic associated with the LIDAR analyzes acquired signals having data to localize and detect landmarks by extracting features. In further examples, cameras acquire signals having information about the surrounding environment from which a system derives awareness about aspects of the surrounding environment, such as with positioning signals. Data derived from these signals can be useful in various circumstances for improving perceptions of the surrounding environment so that systems such as automated driving systems (ADS) can perceive the noted aspects and accurately plan and navigate accordingly.

In general, the further awareness is developed by the vehicle about a surrounding environment, the better an operator can be supplemented with information for driving and/or the better an ADS can control the vehicle to avoid hazards. Certain signals generated or received by a vehicle encounter discrepancies that hinder system tasks. For example, a system perceiving a scene using image signals from a camera observes a lag (e.g., a time lag) when combined with positioning signals due to satellite transmissions that impede object avoidance. Similarly, a vehicle receiving map data from a cloud server may encounter a lag when syncing the map data with the positioning signal, thereby hampering navigation systems that sensitive systems such as automated driving rely upon. Therefore, vehicle systems processing signals from various sources encounter delays that create unsafe and unreliable driving conditions.

SUMMARY

In one embodiment, example systems and methods relate to estimating a gap between positioning and odometry speed-signals through time warping for aligning the speed-signals. In various implementations, vehicle systems collect data from numerous signals, such as a positioning signal and a structure from motion (SfM) signal for driving tasks (e.g., map construction). These signals lack correlated features and operate at different frequencies. Correspondingly, the vehicle systems encounter difficulties correlating and aligning these signals due to the various frequencies. For example, a network interface of the vehicle collects a global navigation satellite system (GNSS) signal at 1 Hertz (Hz) while an SfM signal is collected at 10 Hz. A system may be unable to correct a lag (e.g., a time lag) and align these signals through computing correlations when the signals exhibit minimal temporal deviations within vehicle states (e.g., idling, startup, etc.) and demonstrate the frequency differences, thereby appearing similar. As such, vehicle systems constructing a map from the GNSS signal and the SfM signal have reduced reliability from uncorrected misalignments and lags from the signals.

Therefore, in one embodiment, an estimation system computes a gap between a positioning signal (e.g., GNSS) and an odometry signal (e.g., SfM) for a vehicle using dynamic time warping (DTW) and calibrates components according to the gap (e.g., a time gap, sampling gaps, etc.). Here, the vehicle can acquire positioning data and odometry data generated by on-board hardware at different frequencies. In one approach, the estimation system processes the data for downstream tasks (e.g., map creation, path planning, etc.) by computing a positioning speed-signal and an odometry speed-signal in a temporal space. These downstream tasks demand that the positioning speed-signal and the odometry speed-signal are aligned and synchronized for accurate and reliable processing. As such, the estimation system calculates a cost matrix for the speed-signals using a DTW operation to effectively identify a lag since the speed-signals likely demonstrate reduced correlations. In particular, the DTW operation can align multiple signals exhibiting minimal correlation when the signals flow in time and irrespective of the signals originating from data over a time span that is limited. Accordingly, the estimation system can extract a gap using the cost matrix and align the speed-signals by correcting a lag with the gap, thereby improving the performance of downstream tasks.

In one embodiment, an estimation system for estimating a gap between positioning and odometry speed-signals through time warping for aligning the speed-signals is disclosed. The estimation system includes a memory storing instructions that, when executed by a processor, cause the processor to compute a positioning speed-signal and an odometry speed-signal temporally by a vehicle from positioning data and odometry data, the positioning data and the odometry data generated at different frequencies. The instructions also include instructions to calculate a cost matrix for the positioning speed-signal and the odometry speed-signal using DTW. The instructions also include instructions to extract a time gap using the cost matrix and align the positioning speed-signal and the odometry speed-signal by correcting a lag with the time gap.

In one embodiment, a non-transitory computer-readable medium for estimating a gap between positioning and odometry speed-signals through time warping for aligning the speed-signals and including instructions that when executed by a processor cause the processor to perform one or more functions is disclosed. The instructions include instructions to compute a positioning speed-signal and an odometry speed-signal temporally by a vehicle from positioning data and odometry data, the positioning data and the odometry data generated at different frequencies. The instructions also include instructions to calculate a cost matrix for the positioning speed-signal and the odometry speed-signal using DTW. The instructions include instructions to extract a time gap using the cost matrix and align the positioning speed-signal and the odometry speed-signal by correcting a lag with the time gap.

In one embodiment, a method for estimating a gap between positioning and odometry speed-signals through time warping for aligning the speed-signals is disclosed. In one embodiment, the method includes computing a positioning speed-signal and an odometry speed-signal temporally by a vehicle from positioning data and odometry data, the positioning data and the odometry data generated at different frequencies. The method also includes calculating a cost matrix for the positioning speed-signal and the odometry speed-signal using DTW. The method also includes extracting a time gap using the cost matrix and aligning the positioning speed-signal and the odometry speed-signal by correcting a lag with the time gap.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with estimating a gap between positioning and odometry speed-signals through time warping for aligning the speed-signals are disclosed herein. In various implementations, systems in a vehicle generating signals from sensor data encounter gaps (e.g., a time gap, a sampling gap, etc.) associated with misalignments. For example, systems collecting image and positioning data when a vehicle starts observe a time gap among the data within related signaling. In particular, the systems identify a time gap when data is acquired from different hardware operating at disparate frequencies through computing temporal correlations. However, computations for temporal correlations can demand data samples having a minimum size (e.g., 1000 points) that is unavailable for certain driving states (e.g., startup, idling, etc.). Thus, systems within a vehicle may be unable to align signals from various hardware sources associated with different frequencies, thereby hindering tasks that rely on synchronized and aligned signals.

Therefore, in one embodiment, an estimation system computes a gap between signals from data having different sampling frequencies and aligns the signals by correcting lag using the gap despite limited sample sizes and driving states. In particular, the estimation system may calculate a cost matrix for positioning and odometry speed-signals derived from minimal data samples (e.g., 30 second(s)) using a dynamic time warping (DTW) operation and extract the gap. Here, a speed-signal may be any information that is associated with vehicle motion. In one approach, the estimation system calculates the cost matrix by approximating costs among changing values between speed-signals and extracting the gap through finding an optimal path for the speed-signals. For example, the optimal path between plotted values of the speed-signals is found by minimizing a total cost within potential warping paths. As such, the estimation system can subsequently extract the gap and correct a lag between the speed-signals by searching the optimal path for a flat region that may represent the lag. Accordingly, the estimation system efficiently and accurately aligns speed-signals from disparate hardware sources and minimally sampled data with a DTW operation, thereby improving system robustness for demanding tasks (e.g., mapping, path planning, etc.).

Figure 1:
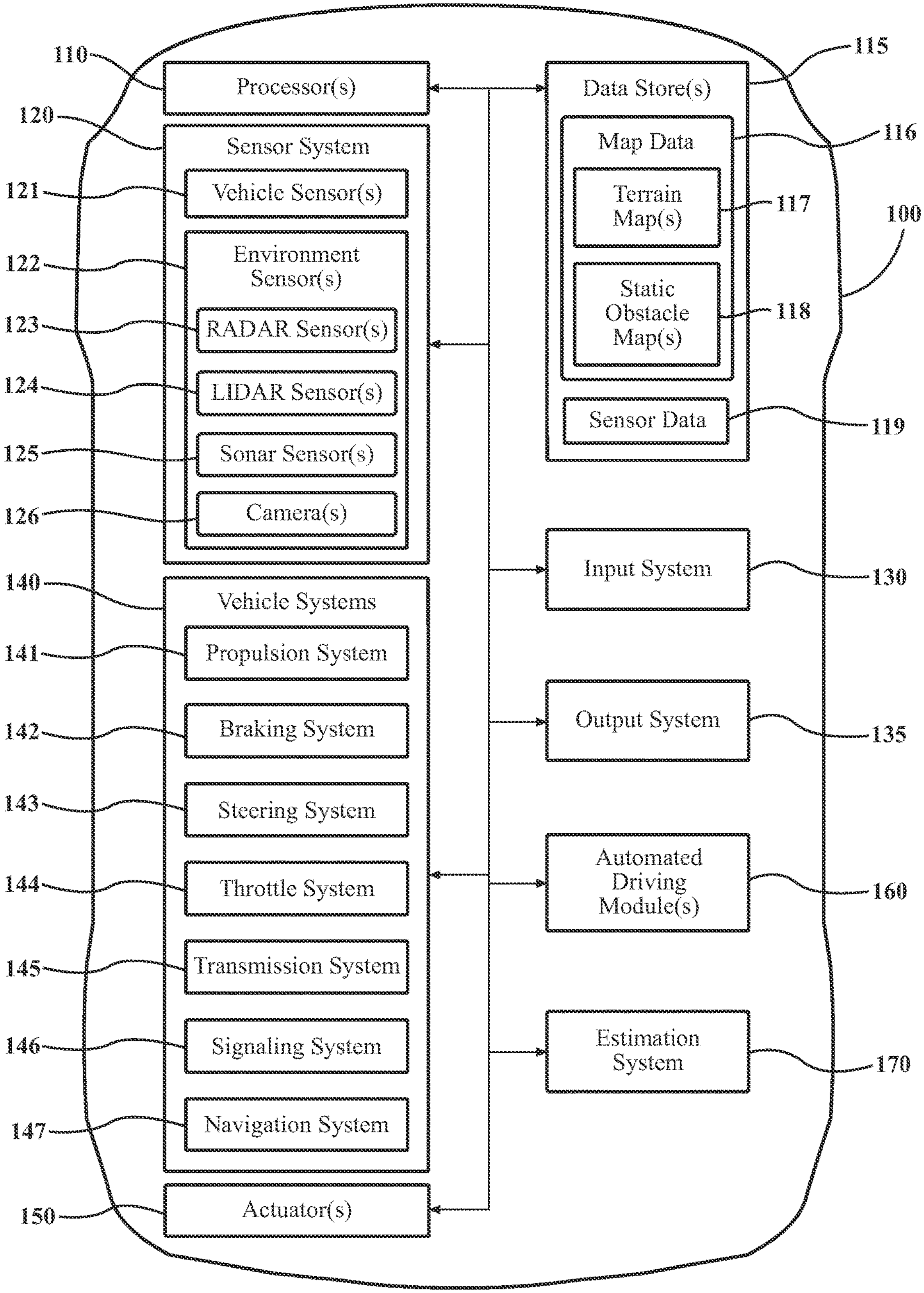
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, an estimation system 170 uses road-side units (RSU), consumer electronics (CE), mobile devices, robots, drones, and so on that benefit from the functionality discussed herein associated with estimating a gap between positioning and odometry speed-signals through time warping for aligning the speed-signals.

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes an estimation system 170 that is implemented to perform methods and other functions as disclosed herein relating to estimating a gap between positioning and odometry speed-signals through time warping for aligning the speed-signals. As will be discussed in greater detail subsequently, the estimation system 170, in various embodiments, is implemented partially within the vehicle 100, and as a cloud-based service. For example, in one approach, functionality associated with at least one module of the estimation system 170 is implemented within the vehicle 100 while further functionality is implemented within a cloud-based computing system.

Figure 2:
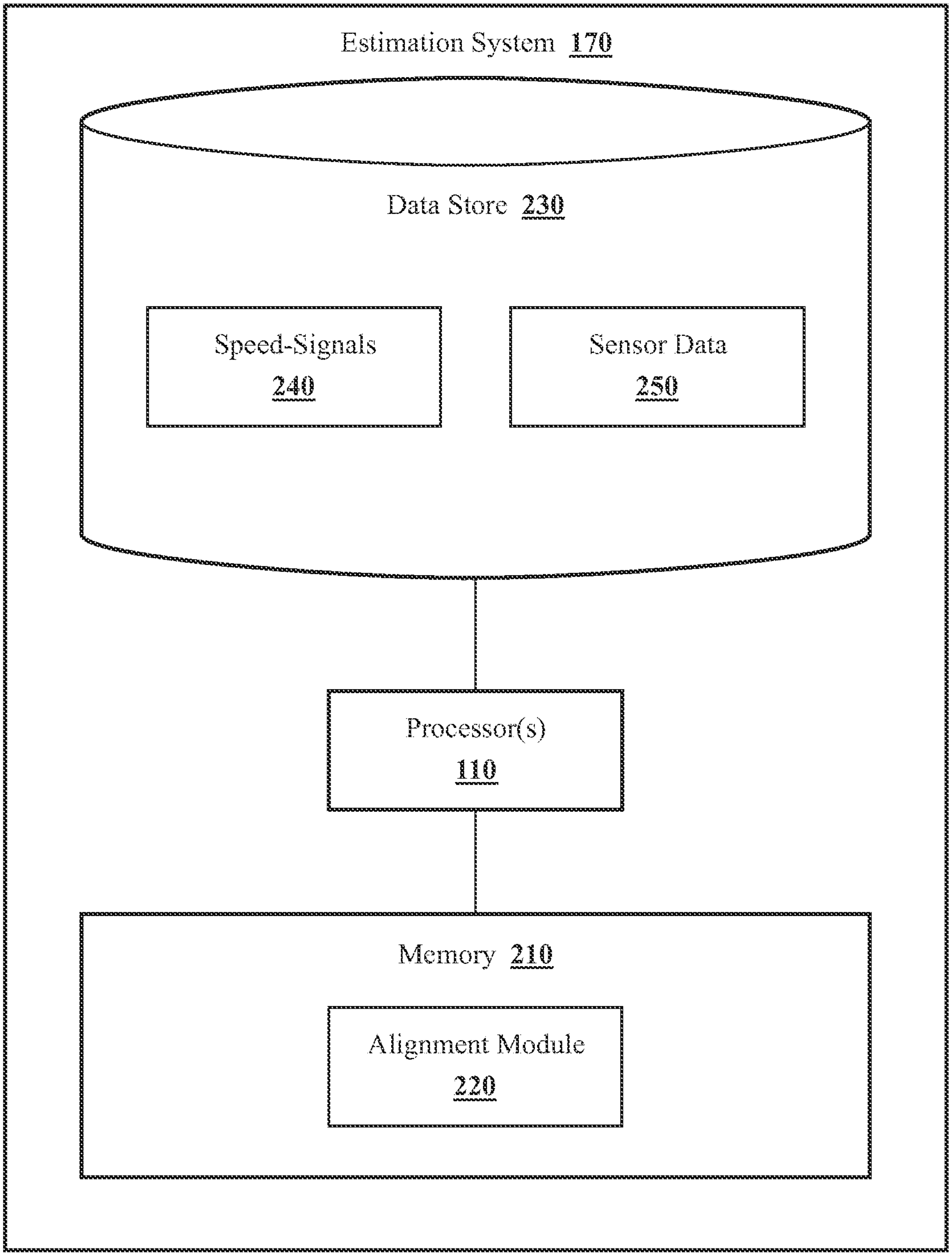
FIG. 2 illustrates one embodiment of an estimation system that is associated with estimating a gap between a positioning speed-signal and an odometry speed-signal through time warping.

With reference to FIG. 2, one embodiment of the estimation system 170 of FIG. 1 is further illustrated. The estimation system 170 is shown as including a processor(s) 110 from the vehicle 100 of FIG. 1. Accordingly, the processor(s) 110 may be a part of the estimation system 170, the estimation system 170 may include a separate processor from the processor(s) 110 of the vehicle 100, or the estimation system 170 may access the processor(s) 110 through a data bus or another communication path. In one embodiment, the estimation system 170 includes a memory 210 that stores an alignment module 220. The memory 210 is a random-access memory (RAM), a read-only memory (ROM), a hard-disk drive, a flash memory, or other suitable memory for storing the alignment module 220. The alignment module 220 is, for example, computer-readable instructions that when executed by the processor(s) 110 cause the processor(s) 110 to perform the various functions disclosed herein.

The estimation system 170 as illustrated in FIG. 2 is generally an abstracted form of the estimation system 170 as may be implemented between the vehicle 100 and a remote system, such as a cloud-computing environment. Furthermore, the alignment module 220 generally includes instructions that function to control the processor(s) 110 to receive data inputs from one or more sensors of the vehicle 100. The inputs are, in one embodiment, observations of one or more objects in an environment proximate to the vehicle 100 and/or other aspects about the surroundings. As provided for herein, the estimation system 170, in one embodiment, acquires sensor data 250 that includes at least camera images. In further arrangements, the estimation system 170 acquires the sensor data 250 from further sensors such as radar sensors 123, LIDAR sensors 124, and other sensors as may be suitable for identifying vehicles and locations of the vehicles.

In one or more embodiments, the estimation system 170 employs techniques to acquire the sensor data 250 that are either active or passive. For example, the estimation system 170 may passively sniff the sensor data 250 from a stream of electronic information provided by the various sensors to further components within the vehicle 100. Moreover, the estimation system 170 can undertake various approaches to fuse data from multiple sensors when providing the sensor data 250 and/or from sensor data acquired over a wireless communication link. Thus, the sensor data 250, in one embodiment, represents a combination of perceptions acquired from multiple sensors.

In addition to vehicle locations, the sensor data 250 may also include, for example, information about lane markings, road boundaries, obstacles, and so on. In one embodiment, the estimation system 170 acquires the sensor data about a forward direction alone. In this case, the vehicle 100 is unequipped with further sensors to include additional regions about the vehicle and/or the additional regions are not scanned due to other reasons.

Moreover, in one embodiment, the estimation system 170 includes a data store 230. In one embodiment, the data store 230 is a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the alignment module 220 in executing various functions. In one embodiment, the data store 230 includes the sensor data 250 along with, for example, metadata that characterize various aspects of the sensor data 250. For example, the metadata can include location coordinates (e.g., longitude and latitude), relative map coordinates or tile identifiers, time/date stamps from when the separate sensor data 250 was generated, and so on.

In one embodiment, the data store 230 further includes the speed-signals 240 representing data over time acquired from the sensor data 119, the navigation system 147, etc. Here, a speed-signal may be any information that is associated with or representative of vehicle speed. As such, a speed-signal changes according to vehicle motion, paths, trajectories, etc. The estimation system 170 can compute and derive a positioning speed-signal and an odometry speed-signal temporally by sampling and interpolating positioning and odometry data. In one approach, the vehicle 100 acquires from on-board hardware the position data as raw data from a satellite-based system, such as a global positioning system (GPS), a global navigation satellite system (GNSS), etc. The odometry data can be raw structure from motion (SfM) data generated by the vehicle 100 with information from one or more cameras 126 using a perception model. For example, the vehicle 100 estimates a three-dimensional (3-D) structure of a scene from two-dimensional (2-D) images as an SfM operation by a model. Furthermore, as explained below, the on-board hardware processing the position data and the odometry data may operate with clock rates that are different, thereby demanding alignments after sampling. In one approach, the estimation system 170 assembles the positioning data and the odometry data into blocks during various vehicle states (e.g., stopping, starting, etc.) for computing the positioning and odometry speed-signals. As such, the estimation system 170 can sample and interpolate for missing values among the positioning data and the odometry data and generate respective speed-signals accordingly.

Figure 3:
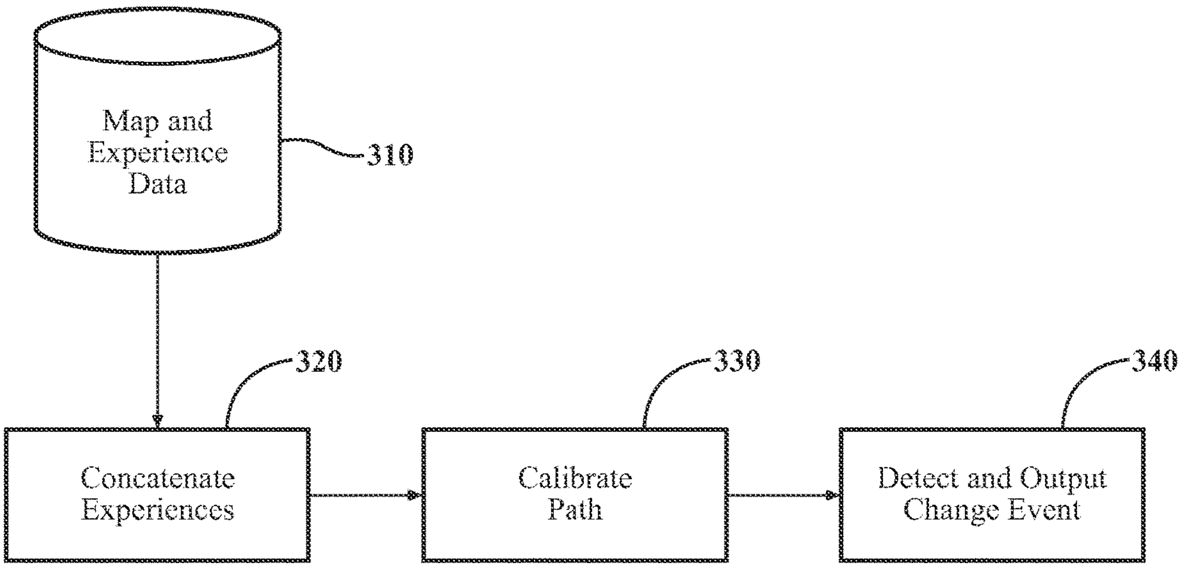
FIG. 3 illustrates one embodiment of the estimation system aligning speed-signals for calibration within a vehicle.

Referring to FIG. 3, one embodiment of the estimation system 170 and the alignment module 220 aligning speed-signals for calibration within a vehicle is illustrated. Although examples reference the vehicle 100, processing and operations for estimating a gap (e.g., a time gap, a sampling gap, etc.) between signals operating at various frequencies with a DTW operation may execute wholly, in part, etc. remotely. Remote systems for estimating the gap can include an edge server, a cloud server, a network server, etc. In FIG. 3, the vehicle 100 acquires map and experience data 310 that includes high-definition (HD) maps, maps generated locally, driver profiles, historical trip information, etc., from the sensor system 120 and remotely through the navigation system 147 (e.g., GPS). In one approach, the concatenate experiences 320 assembles data snippets for a trip from forming the positioning speed-signal and the odometry speed-signal with the map and experience data 310. The estimation system 170 can subsequently align the positioning speed-signal and the odometry speed-signal with the DTW operation within calibrate path 330 which can assist the vehicle 100 path accuracy for automated driving. In particular, the DTW operation measures temporal similarities between the signals as signal speed varies due to sampling frequencies of the source data.

As explained below, the DTW operation temporally aligns signals that are discrete, feature sequences, a time-series, etc., under certain constraints and optimality parameters within a warping path. Furthermore, the detect and output change event 340 for the vehicle 100 can generate a map from temporally stitching data snippets together. For instance, the vehicle 100 generates information about an extended trip (e.g., 90*s*) from stitching multiple data snippets (e.g., 30*s*) after alignment with the estimation system 170 and updates local maps with the information. Accordingly, the vehicle 100 identifies event changes more reliably within the driving environment from generating accurate maps using aligned signals with the estimation system 170.

Figure 4A:
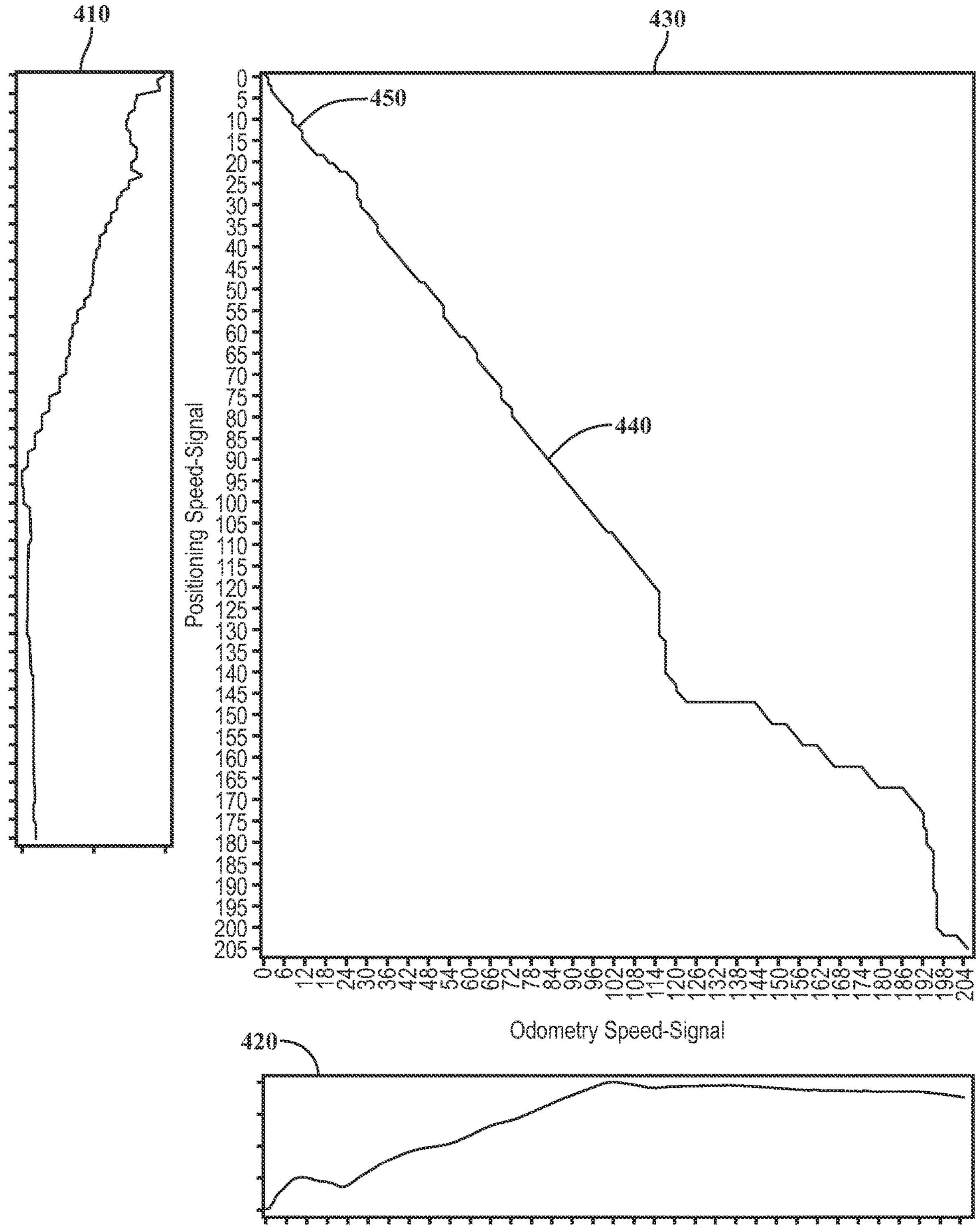
FIGS. 4A-4C illustrate examples of computing dynamic time warping (DTW) and plotting speed-signals for alignment.
Figure 4B:
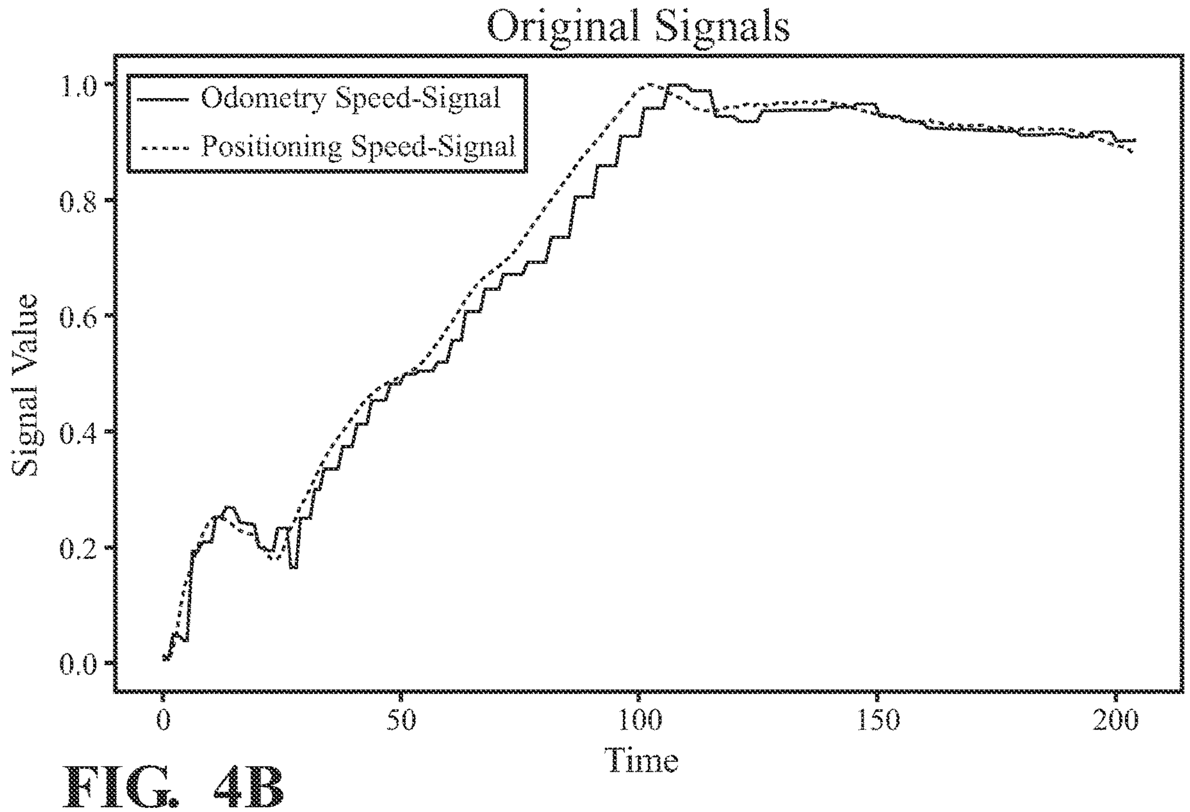
Figure 4C:
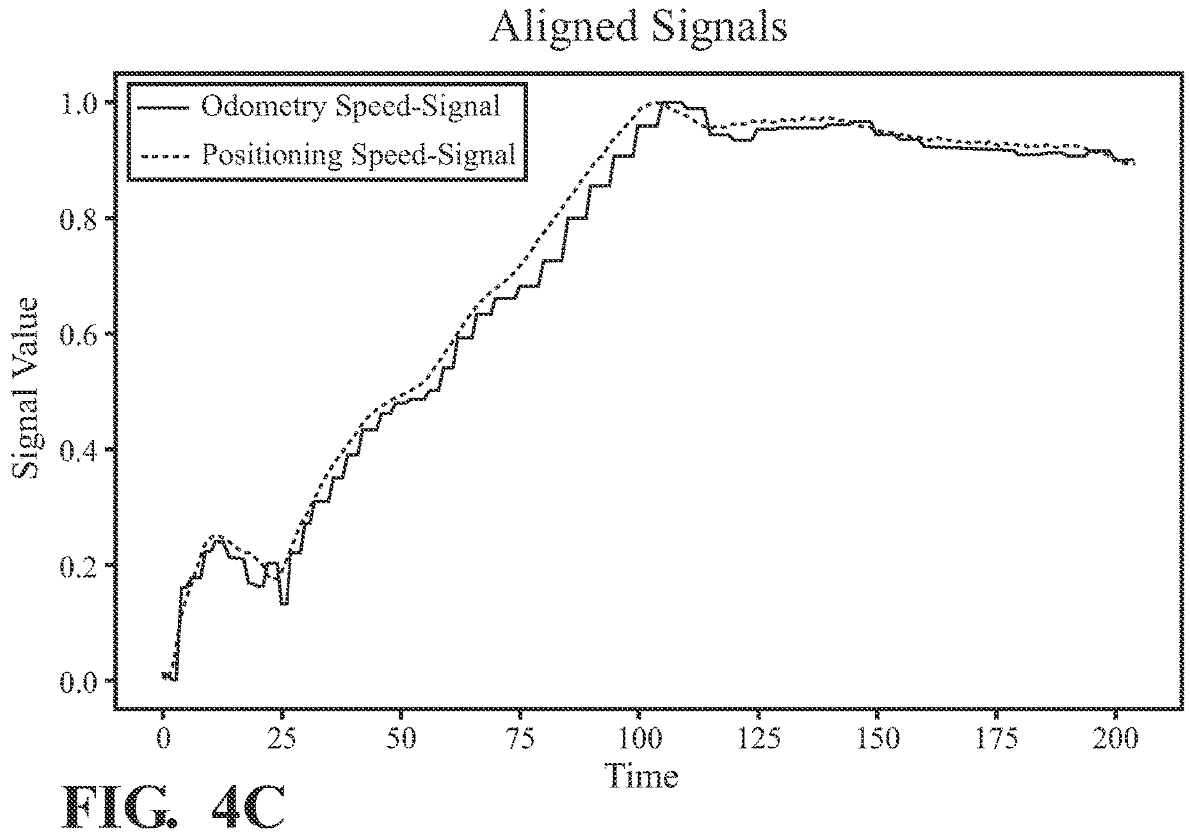

Referring to FIGS. 4A-4C, examples of computing DTW and plotting speed-signals for alignment are illustrated. Here, in one embodiment, the estimation system 170 and the alignment module 220 include instructions that cause the processor 110 to compute a positioning speed-signal 410 and an odometry speed-signal 420 temporally by the vehicle 100 from positioning data and odometry data having sample sizes (e.g., 500 samples) and time spans that are minimal (e.g., 30 seconds). For example, the estimation system 170 acquires and extracts the positioning speed-signal 410 from GNSS hardware of a Toyota™ Safety Sense (TSS) system within the vehicle 100. Similarly, the estimation system 170 acquires and extracts the odometry speed-signal 420 from an SfM hardware (e.g., a system on a chip (SoC)) of the TSS system that processes images using the one or more cameras 126. The GNSS and SfM hardware can have different clocks that cause noticeable offsets and delays (e.g., a microsecond, second) when compared and combined. For instance, the SfM hardware running at 10 Hz can generate 64 entries while the GNSS hardware generates 30 entries (e.g., latitude, longitude, doppler speed for vehicle, doppler direction, etc.) at 1 Hz. As such, the vehicle 100 encounters a delay when acquiring positioning and odometry data.

In another example, computing the speed-signals can involve interpolating the positioning speed-signal 410 with a zero-centering operation and sampling the odometry speed-signal 420 with a normalization operation and a zero-centering operation. The normalization operation can involve adjusting samples of the speed-signals to fall between a range of 0 to x, minimizing errors, and removing inconsistencies from underlying data. The zero-centering operation can involve processing the speed-signals so that the mean is centered on zero, such as through shifting and removing offsets from underlying data. Still, the positioning speed-signal 410 and the odometry speed-signal 420 may be uncorrelated, partly uncorrelated, partly correlated, etc., depending upon vehicle states (stopping, starting, etc.) when compared. FIG. 4B illustrates the speed-signals being misaligned, thereby demanding alignment to prevent errors by downstream tasks relying on synchronized signals. In particular, the estimation system 170 may implement a DTW operation for alignment since the speed-signals can appear similar when computing correlations, especially while exhibiting minimal temporal deviations within vehicle states.

In various implementations, the alignment module 220 calculates a cost matrix for the positioning speed-signal 410 and the odometry speed-signal 420 using a DTW operation that outputs plot 430. The cost matrix allows the estimation system 170 and the alignment module 220 to measure differences iteratively between the speed-signals. Measured gaps within a "dead zone" that is substantially flat (i.e., constant) on the plot 430 derived with the cost matrix can align the speed-signals by analyzing the gaps. The dead zone may occur when the startup signals appear similar by a correlation operation, such as during vehicle startups, idling, vehicle stops, etc. The estimation system 170 may also locate the dead zone in the cost matrix through estimating costs for changing values from and between the positioning speed-signal 410 to the odometry speed-signal 420. This operation may involve corresponding points between the positioning speed-signal 410 and the odometry speed-signal 420 that are misaligned. Furthermore, measuring the differences can include finding an optimal and significant path when comparing the speed-signals that involves examining a DTW distance between proximate and corresponding points of the speed-signals.

In one embodiment, the estimation system 170 extracts a time gap using the cost matrix and aligns the positioning speed-signal 410 and the odometry speed-signal 420 by correcting a lag (e.g., a time lag, a sampling lag, etc.) with the time gap. As previously explained, a DTW operation involves finding an optimal path for multiple speed-signals that are misaligned. As such, an optimal path 440 between plotted values of the positioning speed-signal 410 and the odometry speed-signal 420 is found by minimizing a total cost within potential warping paths. For instance, a warping path having a lower total cost is "good" while having an elevated total cost is "bad." Furthermore, the alignment module 220 can search the optimal path 440 for a flat region parallel with a coordinate axis (e.g., x-axis, y-axis, etc.) of the plot 430. In this case, the search can involve starting at the first cell of the cost matrix (i.e., the (0, 0) position) and counting cells on the optimal path 440 that are parallel to the x-axis or the y-axis. For instance, the flat region 450 having multiple constant values (e.g., ten values) parallel with the y-axis can be the time gap and represent the lag between the positioning speed-signal 410 and the odometry speed-signal 420. Accordingly, FIG. 4C illustrates the estimation system 170 aligning the speed-signals by factoring the time gap and adjusting the speed-signals, such as through identifying the optimal path.

In one approach, the alignment module 220 truncates the plotted values of the positioning speed-signal 410 and the odometry speed-signal 420 into separate subsequences that are manageable data chunks for increasing computing efficiency associated with the DTW operation. The alignment module 220 derives separate warping paths for the subsequences and combines the warping paths into the optimal path 440. Therefore, the estimation system 170 can derive the time gap from plotted areas of the positioning speed-signal 410 and the odometry speed-signal 420 which are a horizontal flat-line, a vertical flat-line, etc. from the optimal path 440 and align the signals accordingly.

Figure 5:
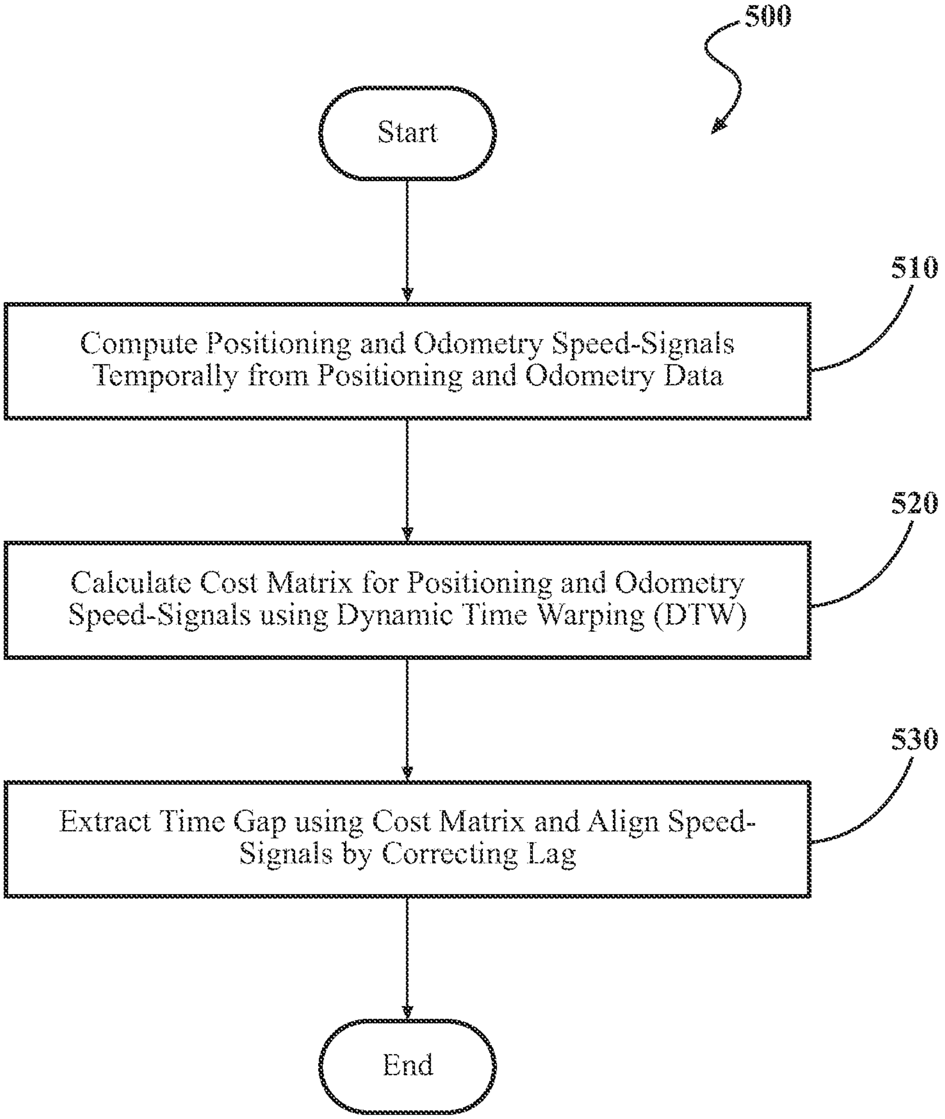
FIG. 5 illustrates one embodiment of a method that is associated with calculating a cost matrix for positioning and odometry speed-signals using a DTW operation and extracting a time gap.

Now turning to FIG. 5, a flowchart of a method 500 that is associated with calculating a cost matrix for positioning and odometry speed-signals using a DTW operation and extracting a time gap is illustrated. Method 500 will be discussed from the perspective of the estimation system 170 of FIGS. 1 and 2. While method 500 is discussed in combination with the estimation system 170, it should be appreciated that the method 500 is not limited to being implemented within the estimation system 170 but is instead one example of a system that may implement the method 500.

At 510, the estimation system 170 computes positioning and odometry speed-signals temporally from positioning and odometry data. A speed-signal can be any information that is associated with vehicle speed. As such, a speed-signal can change from motion of the vehicle 100. In one approach, the estimation system 170 acquires and extracts the positioning speed-signal from positioning hardware within the vehicle 100. Similarly, the estimation system 170 acquires and extracts the odometry speed-signal from SfM hardware (e.g., a SoC) that processes images in a perception model within the vehicle 100. As previously explained, computing the speed-signals can involve interpolating the positioning speed-signal with a zero-centering operation and sampling the odometry speed-signal with a normalization operation and a zero-centering operation. For example, the normalization operation adjusts samples of the speed-signals to fall between a range of 0 to x. Furthermore, the zero-centering operation can involve processing the speed-signals so that the mean is centered on zero, such as through removing offsets from underlying data. Regarding sample sizes, the positioning and odometry data can have minimal sizes for a DTW that is accurate compared to a correlation operation. Following computations and signal processing, the vehicle 100 can observe a delay among the speed-signals that demands correction by the estimation system 170.

At 520, the alignment module 220 calculates a cost matrix for the positioning and odometry speed-signals using a DTW operation. The cost matrix allows measurements of differences between the speed-signals for gaps (e.g., time gaps, sampling gaps, etc.). In one approach, the estimation system 170 derives an optimal path having parts that are substantially flat (i.e., constant) using the cost matrix and aligns the speed-signals by locating a time gap among the optimal path. The estimation system 170 can find time gaps through estimating costs for changing values that correspond from and between the positioning speed-signal to the odometry speed-signal.

Moreover, in one embodiment, the DTW operation involves finding an optimal path for multiple speed-signals that are misaligned. For example, the alignment module 220 finds an optimal path between plotted values of the positioning speed-signal and the odometry speed-signal within potential warping paths by minimizing a total cost. As previously explained, a warping path having a lower total cost is better than a warping path having an elevated total cost. As such, the alignment module 220 can iteratively analyze warp paths and lower total costs until settling on a warp path as optimal. The alignment module 220 can then search the optimal path for a flat region parallel with a coordinate axis (e.g., x-axis, y-axis, etc.) on a plot for the time gap. In one approach, the alignment module 220 increases computational efficiency for the DTW operation by truncating the plotted values of the speed-signals into separate subsequences that are manageable. The alignment module 220 may then derive separate warping paths for the subsequences and combine the warping paths into the optimal path 440 with fewer iterations.

At 530, the estimation system 170 extracts the time gap using the cost matrix and aligns the speed-signals by correcting a lag. Here, the optimal path is searched for a flat region parallel with a coordinate axis (e.g., x-axis, y-axis, etc.) within a plot derived from the positioning speed-signal and the odometry speed-signal. As previously explained, the search can involve counting from a first cell of the cost matrix on the optimal path until finding a sequence that is parallel to the x-axis or the y-axis. For instance, a flat region having multiple values that are constant and parallel with a coordinate axis can be the time gap and represent the lag between the speed-signals. Accordingly, the estimation system 170 aligns the speed-signals with a DTW operation by locating flat regions regardless of sample sizes, thereby improving system efficiency and robustness for demanding tasks (e.g., mapping).

Figure 6:
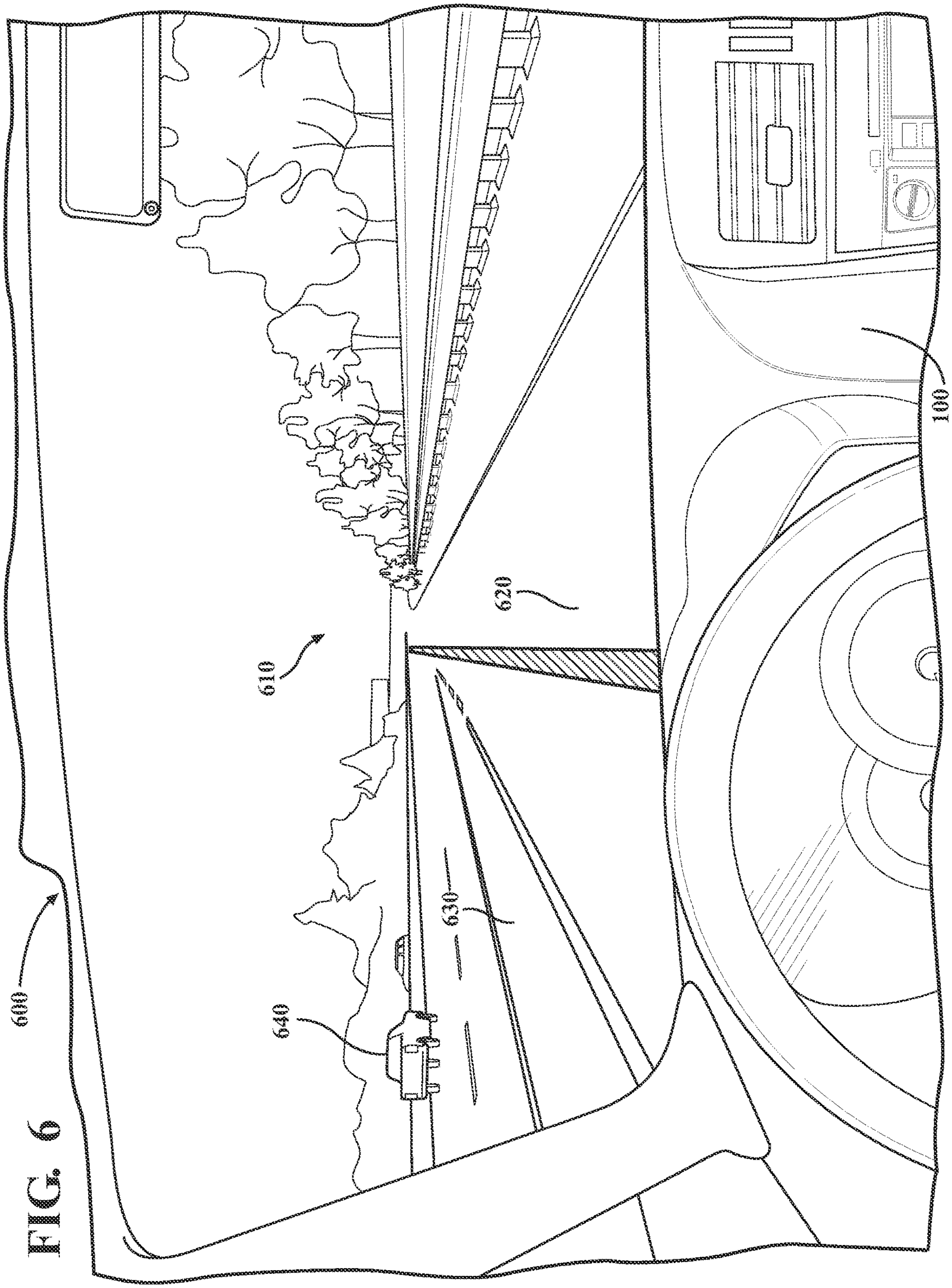
FIG. 6 illustrates an example of a vehicle traveling within a driving environment using a map generated with speed-signals aligned by the estimation system.

Regarding FIG. 6, an example 600 of the vehicle 100 traveling within a driving environment 610 using a map generated with speed-signals aligned by the estimation system 170 is illustrated. In FIG. 6, the vehicle 100 is merging from the lane 620 to the road 630 having the vehicle 640 using a path generated by the automated driving module(s) 160. The vehicle 100 may identify that the map for the road 630 is stale. As such, the vehicle 100 instructs the estimation system 170 to compute positioning and odometry speed-signals temporally from positioning and SfM data, respectively, for updating the map. As previously explained, the alignment module 220 processes the speed-signals and calculates a cost matrix and an optimal path using a DTW operation. The estimation system 170 can search for time gaps with the optimal path through estimating costs for changing values that correspond from and between the positioning speed-signal to the odometry speed-signal. Subsequently, the estimation system 170 extracts a time gap from flat regions within the optimal path using the cost matrix and aligns the speed-signals by correcting a lag with the time gap. In this way, the vehicle 100 can accurately update road information within the map using the aligned speed-signals and merge safely with the updated map. Therefore, the estimation system 170 improves automated driving through aligning speed-signals with the DTW operation and updating maps with the aligned speed-signals accordingly.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, programmable read-only memory (PROM), erasable programmable read-only memory (EPROM), electrically erasable programmable read-only memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located on-board the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a GNSS, a GPS, a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate to the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the estimation system 170, and/or the automated driving module(s) 160 can be operatively connected to communicate with the various vehicle systems 140 and/or individual components thereof. For example, the processor(s) 110 and/or the automated driving module(s) 160 can be in communication to send and/or receive information from the various vehicle systems 140 to control the movement of the vehicle 100. The processor(s) 110, the estimation system 170, and/or the automated driving module(s) 160 may control some or all of the vehicle systems 140 and, thus, may be partially or fully autonomous as defined by the society of automotive engineers (SAE) levels 0 to 5.

The processor(s) 110, the estimation system 170, and/or the automated driving module(s) 160 can be operatively connected to communicate with the various vehicle systems 140 and/or individual components thereof. For example, the processor(s) 110, the estimation system 170, and/or the automated driving module(s) 160 can be in communication to send and/or receive information from the various vehicle systems 140 to control the movement of the vehicle 100. The processor(s) 110, the estimation system 170, and/or the automated driving module(s) 160 may control some or all of the vehicle systems 140.

The processor(s) 110, the estimation system 170, and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110, the estimation system 170, and/or the automated driving module(s) 160 can control the direction and/or speed of the vehicle 100. The processor(s) 110, the estimation system 170, and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the estimation system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-6 but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk™, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An estimation system comprising:

a memory storing instructions that, when executed by a processor, cause the processor to:

compute a positioning speed-signal and an odometry speed-signal temporally by a vehicle from positioning data and odometry data, the positioning data and the odometry data generated at different sampling frequencies;

calculate a cost matrix for the positioning speed-signal and the odometry speed-signal from changing values using dynamic time warping (DTW);

extract a time gap using the cost matrix and align the positioning speed-signal and the odometry speed-signal using plotted areas by correcting a lag with the time gap, wherein the time gap is associated with a startup or an idling of the vehicle when the time gap is flat, and the plotted areas are one of a horizontal flat-line or a vertical flat-line; and control the vehicle on a road upon updating a map using the positioning speed-signal.

2. The estimation system of claim 1, wherein the instructions to calculate the cost matrix further include instructions to: estimate costs for the changing values from the positioning speed-signal to the odometry speed-signal.

3. The estimation system of claim 2, wherein the instructions to extract the time gap further include instructions to:

update the time gap from the plotted areas of the positioning speed-signal and the odometry speed-signal with the vertical flat-line.

4. The estimation system of claim 2, wherein the instructions to extract the time gap further include instructions to:

find an optimal path between plotted values of the positioning speed-signal and the odometry speed-signal by minimizing a total cost within potential warping paths; and search the optimal path for a flat region parallel with a coordinate axis, wherein the flat region is the lag for aligning the positioning speed-signal and the odometry speed-signal.

5. The estimation system of claim 4, wherein the instructions to find the optimal path further include instructions to:

truncate the plotted values of the positioning speed-signal and the odometry speed-signal into subsequences that are separate;

derive warping paths for the subsequences individually; and combine the warping paths into the optimal path.

6. The estimation system of claim 1, wherein the instructions to compute the positioning speed-signal and the odometry speed-signal further include instructions to:

interpolate the positioning speed-signal that includes a first zero-centering operation; and sample the odometry speed-signal that includes a normalization operation and a second zero-centering operation.

7. The estimation system of claim 1 further including instructions to:

assemble information snippets for a trip by the vehicle using the positioning speed-signal and the odometry speed-signal; and generate the map from temporally stitching the information snippets.

8. The estimation system of claim 1 further including instructions to:

acquire, by hardware on the vehicle, the positioning data and the odometry data using clock rates that are different, wherein the positioning data is acquired raw from a satellite-based system and the odometry data is raw structure from motion (SfM) data generated with information from a camera associated with the vehicle; and assemble, by the vehicle, the positioning data and the odometry data into blocks when the vehicle is stopped.

9. The estimation system of claim 1, wherein the positioning speed-signal and the odometry speed-signal are uncorrelated.

10. A non-transitory computer-readable medium comprising: instructions that when executed by a processor cause the processor to:

compute a positioning speed-signal and an odometry speed-signal temporally by a vehicle from positioning data and odometry data, the positioning data and the odometry data generated at different sampling frequencies;

calculate a cost matrix for the positioning speed-signal and the odometry speed-signal from changing values using dynamic time warping (DTW);

extract a time gap using the cost matrix and align the positioning speed-signal and the odometry speed-signal using plotted areas by correcting a lag with the time gap, wherein the time gap is associated with a startup or an idling of the vehicle when the time gap is flat, and the plotted areas are one of a horizontal flat-line or a vertical flat-line; and control the vehicle on a road upon updating a map using the positioning speed-signal.

11. The non-transitory computer-readable medium of claim 10, wherein the instructions to calculate the cost matrix further include instructions to:

estimate costs for the changing values from the positioning speed-signal to the odometry speed-signal.

12. A method comprising:

computing a positioning speed-signal and an odometry speed-signal temporally by a vehicle from positioning data and odometry data, the positioning data and the odometry data generated at different sampling frequencies;

calculating a cost matrix for the positioning speed-signal and the odometry speed-signal from changing values using dynamic time warping (DTW);

extracting a time gap using the cost matrix and aligning the positioning speed-signal and the odometry speed-signal using plotted areas by correcting a lag with the time gap, wherein the time gap is associated with a startup or an idling of the vehicle when the time gap is flat, and the plotted areas are one of a horizontal flat-line or a vertical flat-line; and controlling the vehicle on a road upon updating a map using the positioning speed-signal.

13. The method of claim 12, wherein calculating the cost matrix further includes:

estimating costs for the changing values from the positioning speed-signal to the odometry speed-signal.

14. The method of claim 13, wherein extracting the time gap further includes:

updating the time gap from the plotted areas of the positioning speed-signal and the odometry speed-signal with the vertical flat-line.

15. The method of claim 13, wherein extracting the time gap further includes:

finding an optimal path between plotted values of the positioning speed-signal and the odometry speed-signal by minimizing a total cost within potential warping paths; and searching the optimal path for a flat region parallel with a coordinate axis, wherein the flat region is the lag for aligning the positioning speed-signal and the odometry speed-signal.

16. The method of claim 15, wherein finding the optimal path further includes:

truncating the plotted values of the positioning speed-signal and the odometry speed-signal into subsequences that are separate;

deriving warping paths for the subsequences individually; and combining the warping paths into the optimal path.

17. The method of claim 12, wherein computing the positioning speed-signal and the odometry speed-signal further includes:

interpolating the positioning speed-signal that includes a first zero-centering operation; and sampling the odometry speed-signal that includes a normalization operation and a second zero-centering operation.

18. The method of claim 12 further comprising:

assembling information snippets for a trip by the vehicle using the positioning speed-signal and the odometry speed-signal; and generating the map from temporally stitching the information snippets.

19. The method of claim 12 further comprising:

acquiring, by hardware on the vehicle, the positioning data and the odometry data using clock rates that are different, wherein the positioning data is acquired raw from a satellite-based system and the odometry data is raw structure from motion (SfM) data generated with information from a camera associated with the vehicle; and assembling, by the vehicle, the positioning data and the odometry data into blocks when the vehicle is stopped.

20. The method of claim 12, wherein the positioning speed-signal and the odometry speed-signal are uncorrelated.

* * * * *